United States Patent

Maclin

[15] 3,696,971
[45] Oct. 10, 1972

[54] MECHANISM FOR SIMULTANEOUSLY METERING AND DISPENSING LIQUIDS

[72] Inventor: Ernest Maclin, Paramus, N.J.
[73] Assignee: Electro-Nucleonics, Essex County, N.J.
[22] Filed: Sept. 24, 1970
[21] Appl. No.: 75,109

[52] U.S. Cl. ............... 222/183, 73/425.4 P, 141/18, 222/205
[51] Int. Cl. ............................................. B65d 5/06
[58] Field of Search ............. 222/130, 183, 205, 335; 73/425.4 P, 425.6; 141/8, 18, 31, 59, 67, 238; 23/253, 259

[56] References Cited

UNITED STATES PATENTS

| | | |
|---|---|---|
| 553,044 | 1/1896 | Sharples ............ 73/425.4 P X |
| 3,430,628 | 3/1969 | Wiggins ............... 73/425.6 X |

FOREIGN PATENTS OR APPLICATIONS

| | | |
|---|---|---|
| 1,490,704 | 6/1966 | France ............... 73/425.4 P X |

Primary Examiner—Robert B. Reeves
Assistant Examiner—Larry Martin
Attorney—Henry T. Burke, P. E. Henninger, Lester W. Clark, Gerald W. Griffin, Thomas F. Moran, Howard J. Churchill, R. Bradlee Boal, Christopher C. Dunham and Robert Scobey

[57] ABSTRACT

A multiple liquid dispensing type pipette apparatus has a chamber having a body closed at the top by a cap and at its bottom by a base member. A plurality of pipettes extend through the base of the chamber such that their inner ends are spaced from the cap. A vacuum and pressure connection extends through the chamber whereby the pipettes may be filled with liquid from a source thereof under the influence of vacuum. After the pipettes are filled they may be discharged by venting the chamber to atmosphere and then purged by putting the dispensing chamber under air pressure. A liquid drain extends through the body of the chamber at a point not substantially above its base plate.

3 Claims, 13 Drawing Figures

PATENTED OCT 10 1972 3,696,971

INVENTOR.
ERNEST MACLIN
BY
ATTORNEY

PATENTED OCT 10 1972 3,696,971

INVENTOR.
ERNEST MACLIN
BY
ATTORNEY

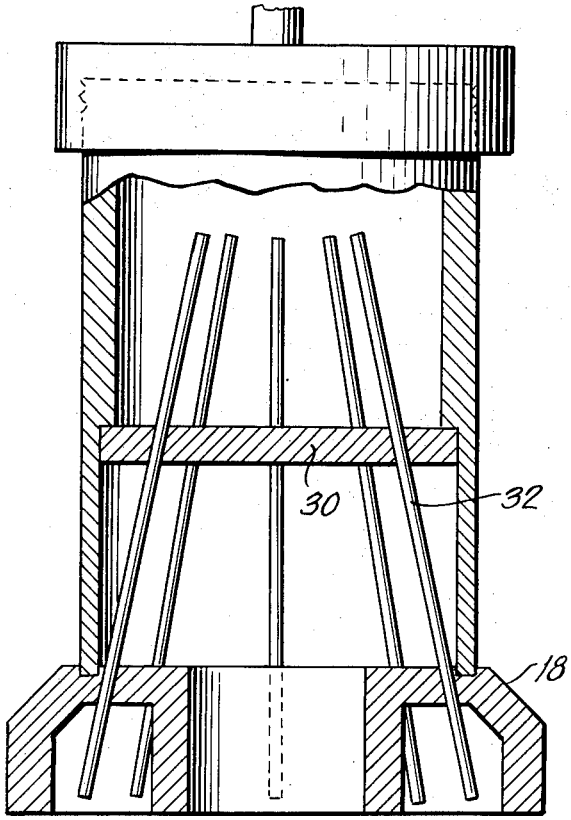
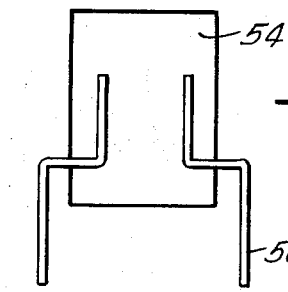
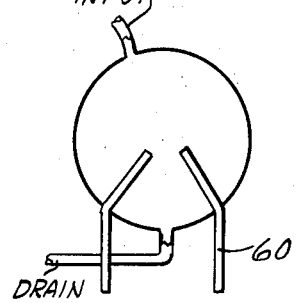
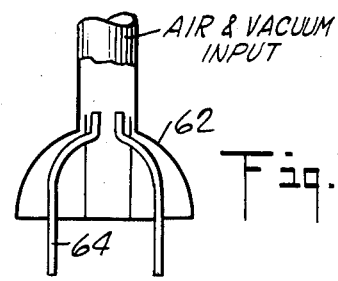
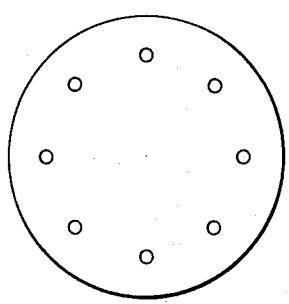
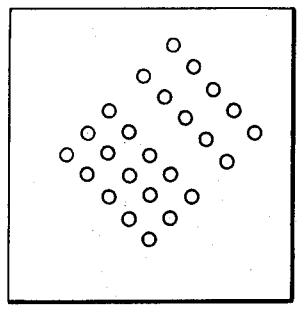
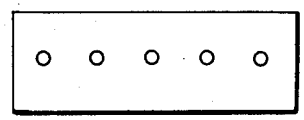
INVENTOR.
ERNEST MACLIN
ATTORNEY

MECHANISM FOR SIMULTANEOUSLY METERING AND DISPENSING LIQUIDS

It is the primary object of the invention to provide an improved pipetting instrument with which a plurality of chambers may be simultaneously metering with unerring accuracy.

It is a further object to provide a liquid metering device which is of particular utility in laboratories and the like where multiple samples of a liquid are subject to a plurality of different tests.

It is a further object of the invention to provide a multiple pipette apparatus which is of simple structure and capable of ready cleansing.

These and other objects and advantages of the invention will be pointed out in the description thereof which is to follow, while still others will be evident from a study of the specification and drawings by those skilled in the art to which the invention pertains.

In the drawings like reference numerals indicate like parts and:

FIG. 7 is a view partly in section and partly in full line of a modified form of dispenser;

FIGS. 8, 9 and 10 are diagrammatic views suggesting various forms of dispensers and FIGS. 11, 12 and 13 are diagrammatic views of ampule racks suggesting various forms thereof.

Figure 1:
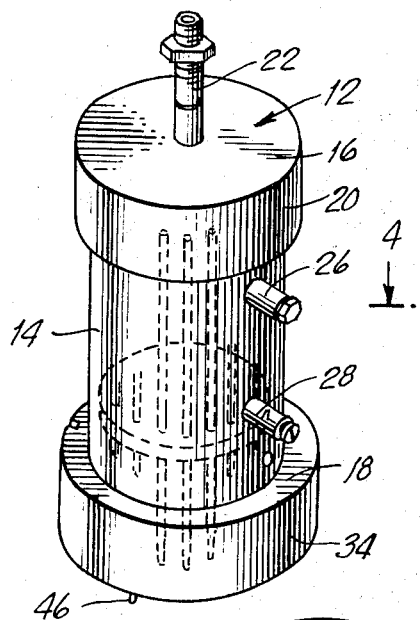
FIG. 1 is a perspective view of the dispenser.
Figure 2:
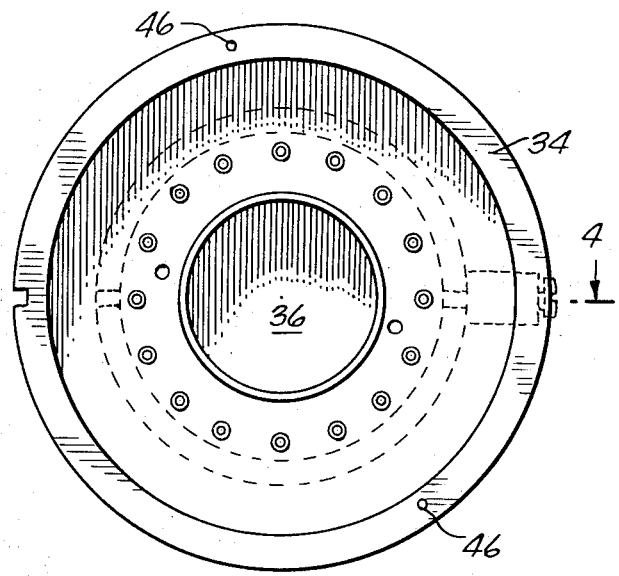
FIG. 2 is a planned view taken from the bottom of the dispenser.
Figure 3:
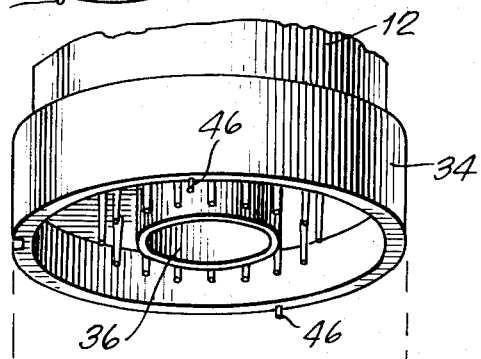
FIG. 3 is an exploded view of a fragment of the dispenser in conjunction with an ampule rack.
Figure 3:
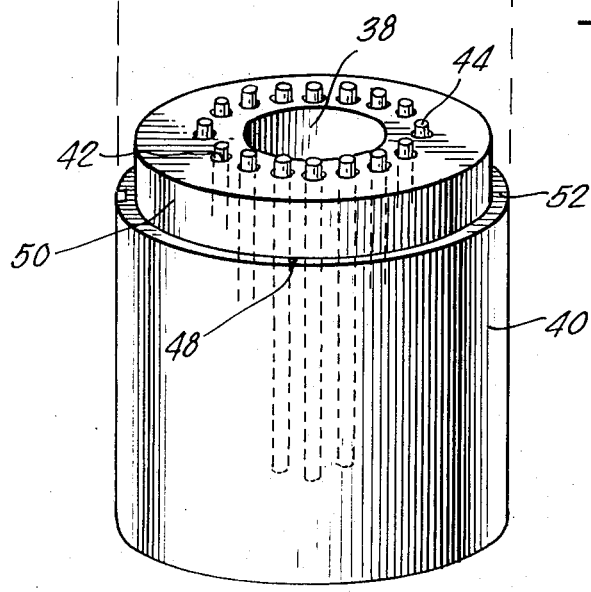
Figure 4:
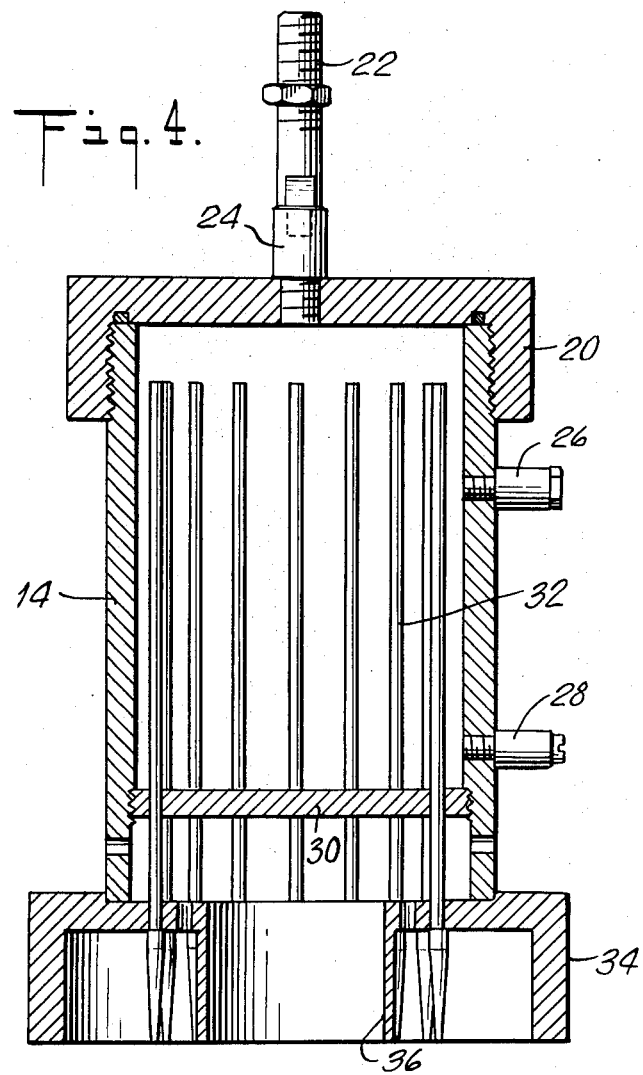
FIG. 4 is a sectional view on line 4—4 of FIG. 2.

The dispenser 12 comprises a sealed chamber formed by a body member 14 having a cap 16 at the upper end thereof and a base 18 at the lower end thereof.

The cap 16 has a depending flange 20 which is internally screw threaded to engage external screw threads at the upper end of the body member 14. This provides for ready access to the interior of the dispenser.

Extending through the cap 16 is an air and vacuum connection 22 which is adapted to be connected to a source of positive and negative pressure preferably by means of flexible tubing having therein suitable cutoff valves. Within the connection 22 is a check valve 24 which will close when the chamber is evacuated.

Extending through the wall of the chamber is an atmospheric vent 26 and near the bottom of the chamber is a drain 28.

Within the chamber is a base plate 30 through which pipettes 32 extend and into which the pipettes are sealed. The base plate 30 may be screw threaded to facilitate its removal from the chamber for interchange with other pipette units having different liquid capacities. The capacity of the pipette can be regulated either by changing the diameter thereof or the length thereof.

The base 18 has a base flange 34 which constitutes a collar adapted to engage a sleeve on an ampule rack as will be pointed out later herein. The base also has a hub 36 adapted to be engaged in a socket 38 of an ampule rack 40. The ampule rack 40 has a plurality of wells in which tubes or ampules 44 are adapted to be received. The number and location of the wells 42 will correspond to the number and location of the pipettes 32 so that exact registration is secured when the dispenser 12 is placed over the rack 40. To facilitate registration of the two units, base flange 34 has extending therefrom a plurality of chamber locating pins 46 which are adapted to enter corresponding pin holes 48 formed in the rack 40.

The pipettes 32 extend downwardly through the base 18, terminating at the lip of the base flange 34. The hub 36 likewise terminates at the lip of the base flange.

Figure 5:
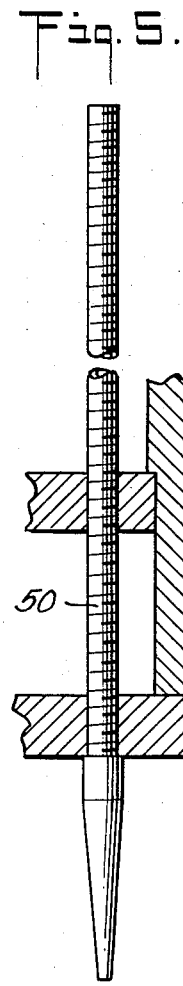
FIG. 5 is a fragmentary view showing a modified form of pipette.
Figure 6:
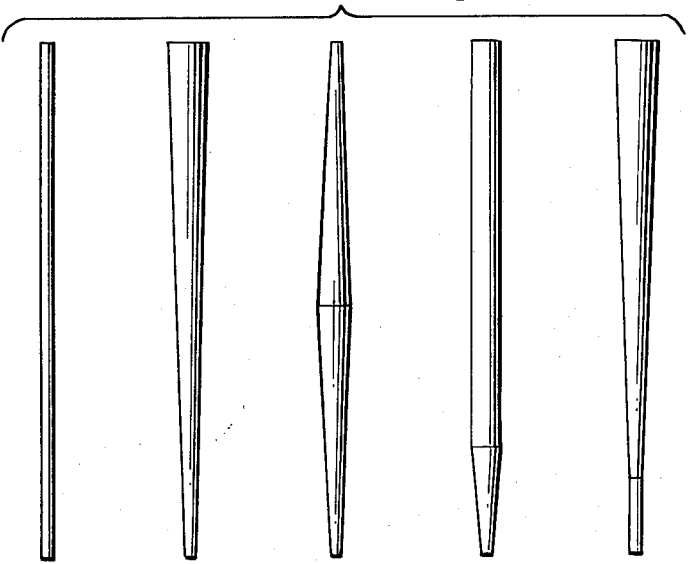
FIG. 6 shows various forms of pipettes.

If desired the pipettes may have external threads 50 (FIG. 5) adapted to tightly engage corresponding threads in the base plate 30 and in the base 18 of the chamber.

When the dispenser is used to transfer liquids from a source thereof such as an open trough or from special containers having wells corresponding to the configuration of the pipettes, the atmospheric vent 26 and the drain 28 are both closed. A vacuum is then applied to the air and vacuum connection 22. This will serve to draw the liquid into the pipettes, such transfer being continued until there is an overflow of the liquid from the upper open ends of the pipettes. This insures accurate measurement of the liquid being withdrawn. The dispenser 12 is then moved over the ampule rack 40 such that the open lower ends of the pipettes will enter the upper open ends of their respective tubes or ampules 44. When this position of the dispenser has been achieved, the inner face of the base flange 34 of the dispenser will snugly engage a sleeve 50 formed at the upper end of the rack 40, the lip of the base flange 34 will engage a shoulder 52 at the upper end of the ampule rack and the chamber locating pins 46 will enter the pinholes 48 in the rack shoulder 52. The dispenser is now in position to discharge the liquid held in the pipettes 32. This charge is accomplished by opening the atmospheric vent 26 which destroys the vacuum within the dispensing chamber and thereby permits the liquid in the pipettes to drain into the tubes or ampules with which they are associated.

Upon destruction of the vacuum within the dispenser chamber, the check valve 24 will open. Thereupon either manually or by automatic sequence means, pressure will be admitted through the air and vacuum connection 22 for the purpose of purging the pipettes of any residual liquid held therein or adhering thereto. Excess liquid which may have drained into the chamber of the dispenser may now be removed through the drain 28.

The foregoing operational sequence may be repeated when the liquid being transferred is the same. Ordinarily if a different liquid is to be dispensed, the cap 16 of the dispenser will be removed for the purpose of cleansing the dispenser by washing or otherwise.

The operation of the dispenser shown in FIG. 7 is the same as that described in respect to the apparatus heretofore described. The only difference being that the pipettes 32 extend through the base plate 30 and through the base 18 at an angle to a horizontal plane.

FIG. 8 is intended to represent a rectangular chamber 54 having extended therefrom pipettes 56. FIG. 9 is to suggest a spherical chamber 58 having extending therefrom pipettes 60. FIG. 10 is still a different embodiment 62 of a dispensing chamber having extending therefrom pipettes 64.

FIG. 11 suggests both a cylindrical dispensing chamber having eight pipettes arranged near the wall thereof and a rack having similarly arranged wells. FIG. 12 suggests a rectangular arrangement of dispenser pipettes and a similar arrangement of ampule wells in the ampule rack. FIG. 13 suggests a linear arrangement of a plurality of pipettes and corresponding arrangement of ampule wells.

While the invention has been most particularly described in respect to one form of dispenser and ampule rack, FIG. 6 through 13 clearly indicate that the form of dispenser pipettes and ampule racks may be embodied in an infinite number of variations, each one of which may be of particular utility in any given situation.

I claim:

1. In a multiple liquid dispensing pipette apparatus, an enclosed chamber, a plurality of pipettes extending through a wall of said chamber, a vacuum and pressure connection with said chamber whereby pipettes may be filled with liquid from a source of such liquid under the influence of a source of vacuum, means of venting said chamber to said atmosphere whereby said pipettes may be discharged, means for supplying pressure into said chamber through said pressure connection whereby said pipettes may be positively purged of residual liquid, rack means for holding a plurality of containers in upright position for receiving liquid from said pipettes, a socket in said rack, and a hub on said chamber adapted to enter said socket for establishing registration between said pipettes and containers in said rack.

2. In a multiple liquid dispensing pipette apparatus, a chamber formed from rigid side walls and a removeable rigid cap closing the top of said side walls and a base plate closing the bottom of said side walls; a base plate closing the bottom of said body, a plurality of pipettes extending through said base plate of said chamber, the inner ends of said pipettes being spaced from said cap and all opening in common to said chamber, a vacuum and pressure connection with said chamber whereby pipettes may be filled with liquid from a source of such liquid under the influence of a source of vacuum, means of venting said chamber to said atmosphere whereby said pipettes may be discharged and means for supplying pressure into said chamber through said pressure connection whereby said pipettes may be positively purged of residual liquid.

3. In a multiple liquid dispensing pipette apparatus, a chamber having a body, a cap closing the top of said body, a base plate closing the bottom of said body, a plurality of pipettes extending through said base plate of said chamber, the inner ends of said pipettes being spaced from said cap, a vacuum and pressure connection with said chamber whereby pipettes may be filled with liquid from a source of such liquid under the influence of a source of vacuum, means of venting said chamber to said atmosphere whereby said pipettes may be discharged, means for supplying pressure into said chamber through said pressure connection whereby said pipettes may be positively purged of residual liquid, and a liquid drain extending through the body of said chamber at a point not substantially above said base plate.

* * * * *